US011172435B2

(12) United States Patent
Wei et al.

(10) Patent No.: US 11,172,435 B2
(45) Date of Patent: Nov. 9, 2021

(54) NETWORK ENTITY, USER EQUIPMENT AND METHOD FOR THE CONTROL AND USE OF NETWORK SLICES

(71) Applicant: Huawei Technologies Co., Ltd., Shenzhen (CN)

(72) Inventors: Qing Wei, Munich (DE); Yinghao Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/810,583

(22) Filed: Mar. 5, 2020

(65) Prior Publication Data

US 2020/0205065 A1 Jun. 25, 2020

Related U.S. Application Data

(63) Continuation of application No. PCT/EP2017/072189, filed on Sep. 5, 2017.

(51) Int. Cl.
*H04W 4/00* (2018.01)
*H04W 48/16* (2009.01)
(Continued)

(52) U.S. Cl.
CPC ............ *H04W 48/16* (2013.01); *H04W 8/08* (2013.01); *H04W 48/18* (2013.01); *H04W 60/00* (2013.01)

(58) Field of Classification Search
CPC ....... H04W 48/16; H04W 8/08; H04W 60/00; H04L 12/24
(Continued)

(56) References Cited

U.S. PATENT DOCUMENTS 10,284,495 B2 * 5/2019 Shimojou ............... H04L 47/82
10,313,997 B2 * 6/2019 Singh .................... H04W 60/00
(Continued)

FOREIGN PATENT DOCUMENTS

WO 2017140341 A1 8/2017

OTHER PUBLICATIONS

"Add requirements of management support for RAN configuration," 3GPP TSG SA WG5 (Telecom Management) Meeting #113, West Palm Beach, Florida (US), S5-173436 (revision of S5-173147), XP51289995A, pp. 1-4, 3rd Generation Partnership Project, Valbonne, France (May 8-12, 2017).
(Continued)

*Primary Examiner* — Marceau Milord
(74) *Attorney, Agent, or Firm* — Leydig, Voit & Mayer, Ltd.

(57) ABSTRACT

A network entity is proposed for controlling the use, by a user equipment, of network slices of a communication network comprising a plurality of slice support areas. Each slice support area comprises at least one cell, and all cells of a given slice support area support the same network slices. A registration area for the registration of the user equipment with the communication network comprises at least one slice support area. The network entity is adapted to transmit, to the user equipment, slice support information for at least one slice support area of the communication network. The slice support information for a given slice support area indicates at least one network slice supported by the given slice support area and/or at least one network slice not supported by the given slice support area.

15 Claims, 4 Drawing Sheets

(51) Int. Cl.
*H04W 8/08* (2009.01)
*H04W 48/18* (2009.01)
*H04W 60/00* (2009.01)

(58) Field of Classification Search
USPC .................................... 370/329, 254, 331
See application file for complete search history.

(56) References Cited

U.S. PATENT DOCUMENTS

| | | | | |
|---|---|---|---|---|
| 10,582,432 | B2* | 3/2020 | Park | H04W 36/0069 |
| 10,608,928 | B2* | 3/2020 | Zhang | H04W 48/18 |
| 10,631,357 | B2* | 4/2020 | Park | H04W 80/02 |
| 10,856,265 | B2* | 12/2020 | Ryu | H04W 72/02 |
| 10,939,333 | B2* | 3/2021 | Jin | H04W 36/00837 |
| 2012/0233302 | A1* | 9/2012 | Kallin | H04L 41/5025 709/221 |
| 2015/0142958 | A1* | 5/2015 | Tamura | H04L 67/1008 709/224 |
| 2017/0054595 | A1* | 2/2017 | Zhang | H04L 41/12 |
| 2017/0079059 | A1* | 3/2017 | Li | H04W 16/02 |
| 2017/0086118 | A1* | 3/2017 | Vrzic | H04W 36/26 |
| 2017/0141973 | A1* | 5/2017 | Vrzic | H04L 41/5051 |
| 2017/0208019 | A1* | 7/2017 | Shimojou | H04L 41/0896 |
| 2017/0367036 | A1* | 12/2017 | Chen | H04L 43/08 |
| 2018/0035399 | A1* | 2/2018 | Xu | H04W 8/06 |
| 2018/0041425 | A1* | 2/2018 | Zhang | H04W 64/00 |
| 2018/0192445 | A1* | 7/2018 | Jiang | H04W 72/0466 |
| 2018/0227871 | A1* | 8/2018 | Singh | H04W 12/068 |
| 2018/0324663 | A1* | 11/2018 | Park | H04W 36/08 |
| 2019/0053120 | A1* | 2/2019 | Park | H04W 76/27 |
| 2019/0075578 | A1* | 3/2019 | Kim | H04B 17/364 |
| 2019/0109823 | A1* | 4/2019 | Qiao | H04L 12/1435 |
| 2019/0174561 | A1* | 6/2019 | Sivavakeesar | H04W 48/12 |
| 2020/0120589 | A1* | 4/2020 | Velev | H04W 60/04 |
| 2020/0228968 | A1* | 7/2020 | Bernardos | H04W 8/245 |

OTHER PUBLICATIONS

"Network slicing for E-UTRA connected to SGC," 3GPP TSG-RAN WG2 Meeting#99, Berlin, Germany, R2-1708402, XP51318266A, pp. 1-4, 3rd Generation Partnership Project, Valbonne, France (Aug. 21-25, 2017).

"3rd Generation Partnership Project; Technical Specification Group Services and System Aspects; System Architecture for the 5G System; Stage 2 (Release 15)," 3GPP TS 23.501 V1.0.0, pp. 1-146, 3rd Generation Partnership Project, Valbonne, France (Jun. 2017).

"3rd Generation Partnership Project; Technical Specification Group Services and System Aspects; System Architecture for the 5G System; Stage 2 (Release 15)," 3GPP TS 23.501 V1.1.0, pp. 1-165, 3rd Generation Partnership Project, Valbonne, France (Jul. 2017).

"3rd Generation Partnership Project; Technical Specification Group Services and System Aspects; Procedures for the 5G System; Stage 2 (Release 15)," 3GPP TS 23.502 V0A.0, pp. 1-126, 3rd Generation Partnership Project, Valbonne, France (May 2017).

"3rd Generation Partnership Project; Technical Specification Group Radio Access Network; Study on New Radio Access Technology; Radio Access Architecture and Interfaces (Release 14)," 3GPP TR 38.801 V1.1.0, pp. 1-83, 3rd Generation Partnership Project, Valbonne, France (Jan. 2017).

* cited by examiner

NETWORK ENTITY, USER EQUIPMENT AND METHOD FOR THE CONTROL AND USE OF NETWORK SLICES

CROSS-REFERENCE TO RELATED APPLICATIONS

This application is a continuation of International Application No. PCT/EP2017/072189, filed on Sep. 5, 2017, the disclosure of which is hereby incorporated by reference in its entirety.

TECHNICAL FIELD

The present invention generally relates to the field of communication network technology. Particularly, the present invention relates to a network entity for controlling the use of network slices by a user equipment, and to a user equipment (UE) for using network slices.

BACKGROUND

The concept of network slice or network slicing is introduced in fifth generation (5G) communication systems in order to address the various requirements from multiple vertical industries assuming a shared network infrastructure. Correspondingly, network services can be customized based on the requirements of different use cases, thereby increasing the network operation efficiency.

Similarly to the structure of a Long Term Evolution (LTE) system or a Universal Mobile Telecommunications System (UMTS) system, the network of a 5G communication system comprises a Radio Access Network (RAN) and a Core Network (CN). In order to obtain service connectivity and e.g. in order to access a service corresponding to a network slice in a 5G communication system, the UE attaches to the CN through the RAN.

Once a communication link is established between the UE and the network, and particularly between the UE and the CN, the service of network slice can be accessed by the UE. In the presence of such a communication link between the UE and the CN through the RAN, the UE is in a state/mode that is generally referred to as connected state or active state. When the UE no longer uses the service of a network slice, that UE may remove or stop the communication link between the UE and the network. The state of the UE is then generally referred to as idle state.

When a UE is in idle state, i.e. when the UE is not actively engaged in a communication, the network—generally the CN—keeps track of the location of the UE with the accuracy of a defined area in the system. Such a defined area is known e.g. from LTE, UMTS, and Global System for Mobile Communications (GSM) systems. In UMTS, such a defined area is referred to as a location area or a routing area. In an LTE system, such a defined area is generally referred to as a Tracking Area (TA) wherein a TA can comprise one or a plurality of cells. A TA is identified by a Tracking Area Identity (TAD. Thereby, the UE is registered in a specific area consisting of at least one TA, identified by a list of TAI. When the UE leaves this specific area the UE registers in another area.

In 5G systems, the UE can be registered in one or more TAs, wherein said one or more TAs define a Registration Area (RA). In other words, the RA is a TAI list. Consequently, a registration at RA-level allows for more than one TA to be assigned to a UE through a single procedure. As long as the UE roams within the TAs that are comprised in the registered RA, the UE does not need to perform a new registration procedure.

Due to diverse deployment and dynamic situations (e.g., load, resource, physical capabilities of the wireless access nodes) in 5G RAN, some network slices may be available only in part of the network. Slice availability can also depend on the operator deployment and different network deployments pertaining to different operators can have different levels of slice support.

When a UE moves, it may go to an area where it registered slice in the network is not supported anymore or where some new network slice(s) could be supported. Therefore, the UE needs to be aware of the change of supported network slice(s). It is disadvantageous that the UE asks for the service of unsupported network slices, which implies cost signalling overhead and latency. It is furthermore disadvantageous that the UE misses new slices that could be provided by the network at certain location.

SUMMARY

Having recognized the above-mentioned disadvantages and problems, the present disclosure describes embodiments that improve the state of the art. In particular, the present disclosure provides a network entity, a user equipment, and methods for improving the user equipment awareness of the network slice support.

According to a first aspect, the present disclosure provides a network entity for controlling the use, by a user equipment, of network slices of a communication network comprising a plurality of slice support areas. Each slice support area comprises at least one cell, and all cells of a given slice support area support the same network slices. A registration area for the registration of the user equipment with the communication network comprises at least one slice support area. The network entity is adapted to transmit, to the user equipment, slice support information for at least one slice support area of the communication network. The slice support information for a given slice support area indicates at least one network slice supported by the given slice support area and/or at least one network slice not supported by the given slice support area.

Thereby, the user equipment awareness of the slice support can be improved. The improved slice awareness has the advantage that the user equipment has an improved knowledge of the change of supported network slices within the communication network. This in turn has the further advantage that the user equipment will not ask for the service of unsupported slices, which reduces the cost signalling overhead and the latency period. A further advantage is that the user equipment will not miss any network slices that could be provided by the communication network in certain slice support areas.

According to a first implementation of the network entity according to the first aspect, the network entity is adapted to allocate a registration area to the user equipment for the registration of the user equipment with the communication network. The network entity is further adapted to transmit, to the user equipment, slice support information for all or a part of the slice support areas of the registration area.

Thereby, the transmission of slice support information for slice support areas of the registration area specifically improves the user equipment awareness of the slice support within the registration area. This is advantageous because the user equipment experience can be improved in case of heterogeneous radio access network (RAN) slice deployment. Furthermore, this facilitates the design of registration area in the network: e.g. it is possible to define a larger registration area with heterogonous slice support in the registration area, and at the same time the frequency and signalling overhead for a registration area update can be reduced because the registration area is larger. This in turn improves the system efficiency because less control signalling is required between the user equipment and the network.

According to a second implementation of the network entity according to the first aspect, the network entity is adapted to transmit the slice support information and registration area information in a message to the user equipment. The registration area information indicates the at least one slice support area comprised in the registration area.

Thereby, the registration area information and the slice support information can be transmitted to the user equipment in one single message. Such a single message transmission is advantageous in that no additional message is required for transmitting the slice support information. Accordingly, the signalling overhead can be reduced.

According to a third implementation of the network entity according to the first aspect, the network entity is adapted to transmit the slice support information in a Non-Access Stratum (NAS) message over a signalling interface defined between the network entity and the user equipment.

Thereby, the slice support information can be transmitted to the user equipment even if no data communication link is established between the user equipment and the communication network.

According to a fourth implementation of the network entity according to the first aspect, the network entity is adapted to transmit the slice support information to the user equipment during a procedure of registration of the user equipment with the communication network, particularly during an initial registration procedure or during a registration update procedure.

Thereby, the slice support information can be transmitted to the user equipment together with other information transmitted to the user equipment during a registration procedure. It is therefore advantageously not necessary to transmit the slice support information by means of a new additional procedure. Furthermore, the transmission of the slice support information can be easily integrated in a Registration procedure of a 5G communication network.

According to a fifth implementation of the network entity according to the first aspect, the network entity is adapted to transmit the slice support information to the user equipment during a user equipment configuration update procedure. The user equipment configuration update procedure is particularly used when the network entity wants to change the user equipment configuration or wants to trigger a user equipment registration update procedure.

Thereby, the slice support information can be transmitted to the user equipment together with other information transmitted to the user equipment during a user equipment configuration update procedure. It is therefore advantageously not necessary to transmit the slice support information by means of a new additional procedure. Furthermore, the transmission of the slice support information can be easily integrated in a UE Configuration Update procedure of a 5G communication network.

According to a sixth implementation of the network entity according to the first aspect, a network slice is identified by a Single Network Slice Selection Assistance information, S-NSSAI. The slice support information for a given slice support area comprises the S-NSSAI of at least one network slice supported or not supported by the given slice support area.

Thereby, user equipment awareness of the slide support can be increased by transmitting only a small amount of information. With a small amount of high-level signalling information transmitted from the network to the user equipment, the user equipment experience can be improved without scarifying the system efficiency.

According to a seventh implementation of the network entity according to the first aspect, a slice support area is a Tracking Area and is identified by a Tracking Area identity, TAI. A TAI list comprises the TAI of each Tracking Area comprised in the registration area. The network entity is adapted to associate, to each given TAI of the TAI list, an S-NSSAI list comprising the S-NSSAI of at least one network slice supported or not supported by the Tracking Area identified by the given TAI. The network entity is adapted to transmit, to the user equipment, the TAI list and the respective S-NSSAI list associated to each TAI of the TAI list.

Thereby, the user equipment awareness of the slice support can be improved in an efficient way by transmitting a compact amount of information.

According to an eighth implementation of the network entity according to the first aspect, the network entity is adapted to allocate a registration area to the user equipment for the registration of the user equipment with the communication network. The registration area comprises at least one slice support area of the communication network. The network entity is adapted to transmit, to the user equipment, slice support information for at least one slice support area that is not comprised in the registration area. Alternatively or in addition thereto, the network entity is adapted to transmit to the user equipment slice support information for at least one slice support area that is neighbouring a slice support area of the registration area.

Thereby, the slice awareness of the user equipment is improved with regard to slice support areas outside of the registration area. This is advantageous in that the user equipment can already analyse the network slices that are supported outside of the registration area. In case the registration area is updated by the communication network, for example because the user equipment leaves the registration area, the user equipment can more rapidly use the supported network slices. Indeed, the user equipment does not need to wait for the reception of slice support information regarding the new registration area.

According to a ninth implementation of the network entity according to the first aspect, the network entity is adapted to select the at least one slice support area of the registration area for the registration of the user equipment with the communication network. The at least one slice support area is selected based on a state and/or a profile and/or a capability of the user equipment.

Thereby, the network entity can optimize the design of the registration area that the network allocates to the user equipment. The state of the user equipment can be idle state or active or connected state. The profile of the user equipment can define which network slices the user equipment is allowed to connect to. The capability of the user equipment can define its physical capability or capabilities.

According to a tenth implementation of the network entity according to the first aspect, the network entity is adapted to select the at least one network slice indicated by the slice support information based on a state of the user equipment and/or a profile of the user equipment and/or a capability of the user equipment and/or use information. The slice use information indicates which network slice(s) can be used by the user equipment or which network slice(s) the user equipment is allowed to use.

Thereby, the network entity can optimize the transmitted slice support information. The state of the user equipment can be idle state or active or connected state. The profile of the user equipment can define which network slices the user equipment is allowed to connect to. The capability of the user equipment can define its physical capability or capabilities. The slice use information can for example be received from the user equipment, or can be alternatively stored in the communication network, particularly in the network entity itself.

According to an eleventh implementation of the network entity according to the first aspect, the network entity implements an Access and Mobility Management function (AMF).

Thereby, the network entity can be used in a 5G communication network, since the Access and Mobility Management function is a network function of a 5G communication network.

According to a second aspect, the disclosure relates to a method for controlling the use of network slices by a user equipment in a communication network comprising a plurality of slice support areas. Each slice support area comprises at least one cell, and all cells of a given slice support area support the same network slices. A registration area for the registration of the user equipment with the communication network comprises at least one slice support area. The method comprises transmitting, to the user equipment, slice support information for at least one slice support area of the communication network. The slice support information for a given slice support area indicates at least one network slice supported by the given slice support area and/or at least one network slice not supported by the given slice support area.

Thereby, the user equipment awareness of the slice support can be improved. The improved slice awareness has the advantage that the user equipment has an improved knowledge of the change of supported network slices within the communication network. This in turn has the further advantage that the user equipment will not ask for the service of unsupported slices, which reduces the cost signalling overhead and the latency period. A further advantage is that the user equipment will not miss any network slices that could be provided by the communication network in certain slice support areas.

According to a first implementation of the method according to the second aspect, the method comprises allocating a registration area to the user equipment for the registration of the user equipment with the communication network. The method further comprises transmitting, to the user equipment, slice support information for all or a part of the slice support areas of the registration area.

Thereby, the transmission of slice support information for slice support areas of the registration area specifically improves the user equipment awareness of the slice support within the registration area. This is advantageous because the user equipment experience can be improved in case of heterogeneous radio access network (RAN) slice deployment. Furthermore, this facilitates the design of registration area in the network: e.g. it is possible to define a larger registration area with heterogonous slice support in the registration area, and at the same time the frequency and signalling overhead for a registration area update can be reduced because the registration area is larger. This in turn improves the system efficiency because less control signalling is required between the user equipment and the network.

According to a second implementation of the method according to the second aspect, the method comprises transmitting the slice support information and registration area information in a message to the user equipment. The registration area information indicates the at least one slice support area comprised in the registration area.

Thereby, the registration area information and the slice support information can be transmitted to the user equipment in one single message. Such a single message transmission is advantageous in that no additional message is required for transmitting the slice support information. Accordingly, the signalling overhead can be reduced.

According to a third implementation of the method according to the second aspect, the method comprises transmitting the slice support information in a Non-Access Stratum (NAS) message over a signalling interface defined between the communication network and the user equipment.

Thereby, the slice support information can be transmitted to the user equipment even if no data communication link is established between the user equipment and the communication network.

According to a fourth implementation of the method according to the second aspect, the method comprises transmitting the slice support information to the user equipment during a procedure of registration of the user equipment with the communication network, particularly during an initial registration procedure or during a registration update procedure.

Thereby, the slice support information can be transmitted to the user equipment together with other information transmitted to the user equipment during a registration procedure. It is therefore advantageously not necessary to transmit the slice support information by means of a new additional procedure. Furthermore, the transmission of the slice support information can be easily integrated in a Registration procedure of a 5G communication network.

According to a fifth implementation of the method according to the second aspect, the method comprises transmitting the slice support information to the user equipment during a user equipment configuration update procedure. The user equipment configuration update procedure is particularly used when the communication network wants to change the user equipment configuration or wants to trigger a user equipment registration update procedure.

Thereby, the slice support information can be transmitted to the user equipment together with other information transmitted to the user equipment during a user equipment configuration update procedure. It is therefore advantageously not necessary to transmit the slice support information by means of a new additional procedure. Furthermore, the transmission of the slice support information can be easily integrated in a UE Configuration Update procedure of a 5G communication network.

According to a sixth implementation of the method according to the second aspect, a network slice is identified by a Single Network Slice Selection Assistance information (S-NSSAI). The slice support information for a given slice support area comprises the S-NSSAI of at least one network slice supported or not supported by the given slice support area.

Thereby, user equipment awareness of the slide support can be increased by transmitting only a small amount of information. With a small amount of high-level signalling information transmitted from the network to the user equipment, the user equipment experience can be improved without scarifying the system efficiency.

According to a seventh implementation of the method according to the second aspect, a slice support area is a Tracking Area and is identified by a Tracking Area identity (TAI). A TAI list comprises the TAI of each Tracking Area comprised in the registration area. The method comprises associating, to each given TAI of the TAI list, an S-NSSAI list comprising the S-NSSAI of at least one network slice supported or not supported by the Tracking Area identified by the given TAI. The method comprises transmitting, to the user equipment, the TAI list and the respective S-NSSAI list associated to each TAI of the TAI list.

Thereby, the user equipment awareness of the slice support can be improved in an efficient way by transmitting a compact amount of information.

According to an eighth implementation of the method according to the second aspect, the method comprises allocating a registration area to the user equipment for the registration of the user equipment with the communication network. The registration area comprises at least one slice support area of the communication network. The method comprises transmitting, to the user equipment, slice support information for at least one slice support area that is not comprised in the registration area. Alternatively or in addition thereto, the method comprises transmitting, to the user equipment, slice support information for at least one slice support area that is neighbouring a slice support area of the registration area.

Thereby, the slice awareness of the user equipment is improved with regard to slice support areas outside of the registration area. This is advantageous in that the user equipment can already analyse the network slices that are supported outside of the registration area. In case the registration area is updated by the communication network, for example because the user equipment leaves the registration area, the user equipment can more rapidly use the supported network slices. Indeed, the user equipment does not need to wait for the reception of slice support information regarding the new registration area.

According to a ninth implementation of the method according to the second aspect, the method comprises selecting the at least one slice support area of the registration area for the registration of the user equipment with the communication network. The at least one slice support area is selected based on a state and/or a profile and/or a capability of the user equipment.

Thereby, the communication network can optimize the design of the registration area that the network allocates to the user equipment.

According to a tenth implementation of the method according to the second aspect, the method comprises selecting the at least one network slice indicated by the slice support information based on a state of the user equipment and/or a profile of the user equipment and/or a capability of the user equipment and/or slice use information. The slice use information indicates which network slice(s) can be used by the user equipment or which network slice(s) the user equipment is allowed to use.

Thereby, the network entity can optimize the transmitted slice support information. The state of the user equipment can be idle state or active or connected state. The profile of the user equipment can define which network slices the user equipment is allowed to connect to. The capability of the user equipment can define its physical capability or capabilities. The slice use information can for example be received from the user equipment, or can be alternatively stored in the communication network, particularly in the network entity itself.

According to an eleventh implementation of the method according to the second aspect, the method comprises implementing an Access and Mobility Management function (AMF).

Thereby, the method can be used in a 5G communication network, since the Access and Mobility Management function is a network function of a 5G communication network.

According to a third aspect, the disclosure relates to a communication network comprising at least one network entity according to the first aspect.

According to a fourth aspect, the disclosure relates to a user equipment for using network slices of a communication network comprising a plurality of slice support areas. Each slice support area comprises at least one cell, and all cells of a given slice support area support the same network slices. A registration area for the registration of the user equipment with the communication network comprises at least one slice support area. The user equipment is adapted to receive, from the communication network, slice support information for at least one slice support area of the communication network. The slice support information for a given slice support area indicates at least one network slice supported by the given slice support area and/or at least one network slice not supported by the given slice support area.

Thereby, the user equipment awareness of the slice support can be improved. The improved slice awareness has the advantage that the user equipment has an improved knowledge of the change of supported network slices within the communication network. This in turn has the further advantage that the user equipment will not ask for the service of unsupported slices, which reduces the cost signalling overhead and the latency period. A further advantage is that the user equipment will not miss any network slices that could be provided by the communication network in certain slice support areas.

According to a first implementation of the user equipment according to the fourth aspect, the user equipment is adapted to transmit a service request to the communication network for a service corresponding to a network slice defined in the received slice support information.

Thereby, the user equipment can use the slice support information to decide on the network slice to be initiated by a service request. Advantageously, the user equipment can map the service request to an available network slice that is not a default or optimal network slice for that service. Also, it is advantageous that the user equipment can map the service request to the default/optimal network slice for that service only in case that network slice is available.

According to a fifth aspect, the disclosure relates to a method for using, by a user equipment, network slices of a communication network comprising a plurality of slice support areas. Each slice support area comprises at least one cell, and all cells of a given slice support area support the same network slices. A registration area for the registration of the user equipment with the communication network comprises at least one slice support area. The method comprises receiving, from the communication network, slice support information for at least one slice support area of the communication network. The slice support information for a given slice support area indicates at least one network slice supported by the given slice support area and/or at least one network slice not supported by the given slice support area.

Thereby, the user equipment awareness of the slice support can be improved. The improved slice awareness has the advantage that the user equipment has an improved knowledge of the change of supported network slices within the communication network. This in turn has the further advantage that the user equipment will not ask for the service of unsupported slices, which reduces the cost signalling overhead and the latency period. A further advantage is that the user equipment will not miss any network slices that could be provided by the communication network in certain slice support areas.

According to a first implementation of the method according to the fifth aspect, the method comprises transmitting a service request to the communication network for a service corresponding to a network slice defined in the received slice support information.

Thereby, the user equipment can use the slice support information to decide on the network slice to be initiated by a service request. Advantageously, the user equipment can map the service request to an available network slice that is not a default or optimal network slice for that service. Also, it is advantageous that the user equipment can map the service request to the default/optimal network slice for that service only in case that network slice is available.

According to a sixth aspect, the disclosure relates to a computer program having a program code for performing a method according to the second or fifth aspects, when the computer program runs on a computing device.

Thereby, the method can be performed in an automatic and repeatable manner. Advantageously, the computer program can be respectively performed by the network entity according to the first aspect or by the user equipment according to the fourth aspect.

More specifically, it should be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the internet.

These and other aspects of the disclosure will be apparent and elucidated with reference to the embodiments described hereinafter.

BRIEF DESCRIPTION OF THE DRAWINGS

The above aspects and implementation forms of the present disclosure will be explained in the following description of specific embodiments in relation to the enclosed drawings, in which.

DETAILED DESCRIPTION OF EMBODIMENTS OF THE INVENTION

Figure 1:
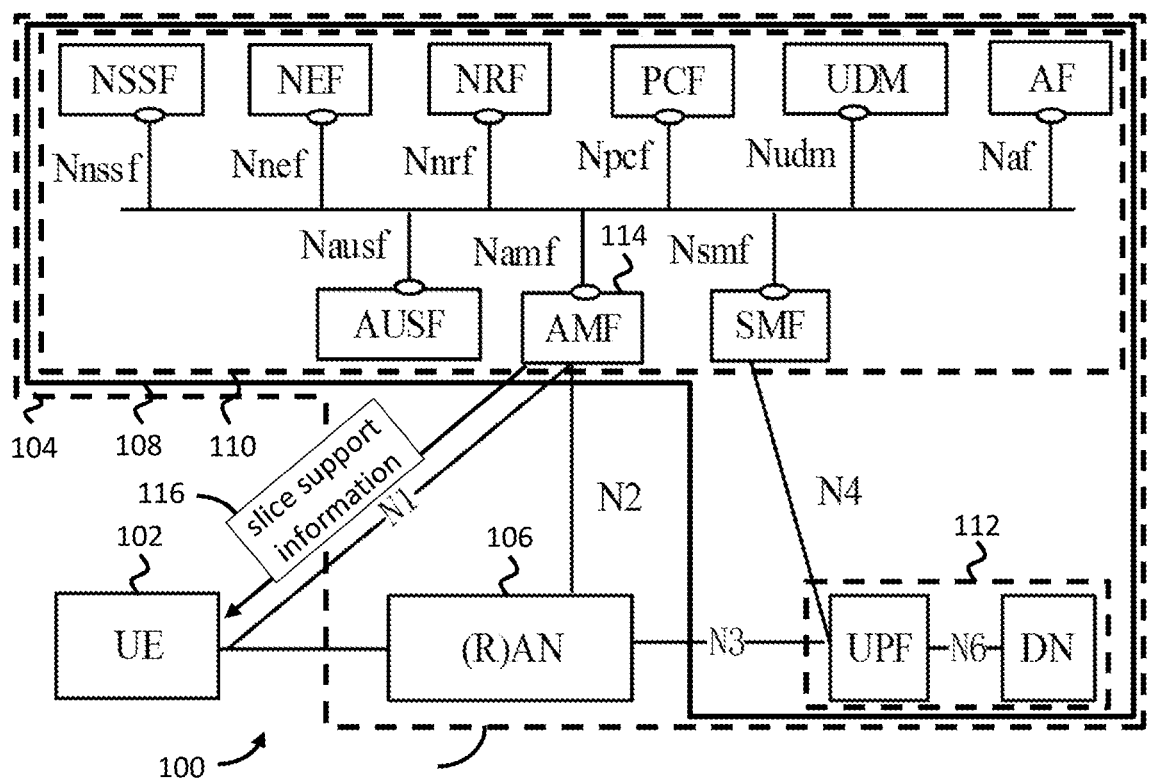
FIG. 1 shows a system comprising a communication network and a user equipment according to an embodiment.

FIG. 1 shows a system 100 comprising a communication network 104 and a user equipment, UE, 102 according to an embodiment.

The communication network 104 comprises a network entity 114 for controlling the use, by the user equipment 102, of network slices of the communication network 104. The communication network 104 comprises a plurality of slice support areas. Each slice support area comprises at least one cell, and all cells of a given slice support area support the same network slices. A registration area, which is adapted to be used for the registration of the user equipment 102 with the communication network 104, comprises at least one slice support area.

The network entity 114 is adapted to transmit, to the user equipment 102, slice support information 116 for at least one slice support area of the communication network 104. The slice support information 116 for a given slice support area indicates at least one network slice that is supported by the given slice support area. Alternatively or in addition thereto, the slice support information 116 for a given slice support area indicates at least one network slice that is not supported by the given slice support area.

The user equipment 102 is adapted to receive from the communication network 104 the slice support information 116 for at least one slice support area of the communication network 104.

Particularly, a network slice can be a logical network that provides specific network capabilities and network characteristics. A network slice instance can be a set of network function instances and the required resources (e.g. compute, storage and networking resources), which form a deployed network slice.

A network function can be a 3rd Generation Partnership Project (3GPP) defined processing function in a network, which has defined functional behaviour and 3GPP defined interfaces. A network function can be implemented either as a network element on a dedicated hardware, as a software instance running on a dedicated hardware, or as a virtualised function instantiated on an appropriate platform, e.g. on a cloud infrastructure.

The above definitions of network slice, network slice instance and network function are in accordance with the technical specification 3GPP TS 23.501 "System Architecture for the 5G System; Stage 2 (Release 15)", and for example in the version 1.2.0 dated July 2017 of the specification 3GPP TS 23.501.

Particularly, a slice support area can comprise at least one cell of the communication network. Such a cell generally corresponds to an area of radio coverage in a cellular communication network. A cell is generally served by a base station. A slice support area can be referred to in a 5G communication network as a Tracking Area (TA).

Particularly, the registration area can be a Registration Area (RA) according to 5G systems. The user equipment can register with the communication network 104 at registration area level, i.e. at a registration area granularity. As long as the user equipment roams within the slice support areas of the registration area it has registered, the user equipment does not need to perform a new registration procedure.

In accordance with the specification 3GPP TR 21.905, for example in its version 14.1.1, the registration area can be an area in which the user equipment may roam without a need to perform a new location registration. The location registration can be defined as the procedure in which the user equipment registers its presence in a registration area, for instance regularly or when entering a new registration area. The location registration can be a Non-Access Stratum (NAS) procedure.

Furthermore, in accordance with the specification 3GPP TS 23.501 v1.2.0, the registration area management can comprise the functions to allocate and reallocate a registration area to a user equipment. Registration area can be managed per access type i.e., 3GPP access or Non-3GPP access. When the user equipment 102 registers with the communication network 104 over the 3GPP access, the network entity 114 allocates a set of slice support areas as a registration area to the user equipment. Particularly, the network entity 114 in the form of an Access and Mobility Management Function (AMF) can allocate a set of Tracking Areas in TAI List to the user equipment.

When the network entity 114 allocates a registration area to the user equipment, it may take into account various information. Such information may be e.g. the mobility pattern of the user equipment and allowed/non-allowed area. An allowed/non-allowed area can be an area, in which the user equipment may or may not initiate communication with the communication network 104.

The architecture of the system 100 of FIG. 1 can be based on the 5G system architecture as defined for example in the specification 3GPP TS 23.501 v1.2.0. The communication network 104 comprises a Radio Access Network, RAN, 106 and a Core Network (CN) 108. For obtaining service connectivity and e.g. for accessing a service corresponding to a network slice in the 5G communication system, the UE attaches to the CN 108 through the RAN 106.

The Core Network 108 comprises a Control Plane (CP) 110 and User Plane (UP) 112. Separating the UP functions from the CP functions allows for example independent scalability, evolution and flexible deployments of the corresponding functions.

The Control Plane 110 comprises an Access and Mobility Management Function (AMF) or Core Access and Mobility Management Function, which can be implemented by the network entity 114. As shown in FIG. 1, the network entity 114 and the user equipment 102 are connected by a connection N1. The connection N1 is preferably a signalling connection, particularly adapted to transmit Non Access Stratum, NAS, signalling. The network entity is adapted to establish the connection N1 with the user equipment, and transmit a message comprising the slice support information 116 to the mobile terminal over the connection N1.

The Control Plane 110 can comprise further functions known from 5G systems like:
Network Slice Selection Function (NSSF)
Network Exposure Function (NEF)
Network Repository Function (NRF)
Policy Control function (PCF)
Unified Data Management (UDM)
Application Function (AF)
Authentication Server Function (AUSF)
Session Management Function (SMF).

These functions present corresponding service-based interfaces. For example and as shown in FIG. 1, the NSSF presents an Nnssf.

The User Plane 112 comprises a User plane Function (UPF) and a Data network (DN) corresponding e.g. to operator services, Internet access or 3rd party services.

Particularly, the network entity 114 is adapted to allocate a registration area to the user equipment 102 for the registration of the user equipment 102 with the communication network 104. The network entity 114 is further adapted to transmit, to the user equipment 102, slice support information 116 for all of the slice support areas of the registration area.

Alternatively, the network entity 114 is further adapted to transmit, to the user equipment 102, slice support information 116 for a part of all the slice support of the registration area. This alternative relates to a case in which only partial slice support information is included in the transmission to the user equipment. The partial slice support information relates to slice support information for certain, but not all, slice support areas of the registration area. For example, the slice support information can indicate supported and/or non-supported network slices of one slice support area. For example, the slice support information of one registration area 200 (per slice support area) can be updated partially: e.g., the transmitted slice support information can only include the slice support area(s) and the corresponding supported/not-supported network slices that are different from what was signalled to the user equipment in a previously transmitted slice support information.

The transmission of partial slice support information can be performed, for example, if the support of network slices has changed in one or more slice support areas of the registration areas. In such a case, the network entity 114 is allowed to transmit slice support information only for these one or more slice support areas whose network slice support has changed. Particularly, the slice support information can indicate one or more additional network slices that are newly supported by a given slice support area. Furthermore, the slice support information can indicate one or more network slices that are not anymore supported by a given slice support area.

The slice support information transmitted for a given slice support area can indicate all network slices that are supported by the given slice support area. Alternatively, the slice support information transmitted by the network entity 114 to the user equipment 102 can be related to the user equipment. In other words, the transmitted slice support information can indicate only the network slices that can be used by the user equipment. Accordingly, the network entity can analyse which network slices can be used by the user equipment—for example by receiving corresponding information from the user equipment or by reading corresponding information stored in the communication network—and then limit the transmitted slice support information to the network slices that can be used by the user equipment.

Figure 2:
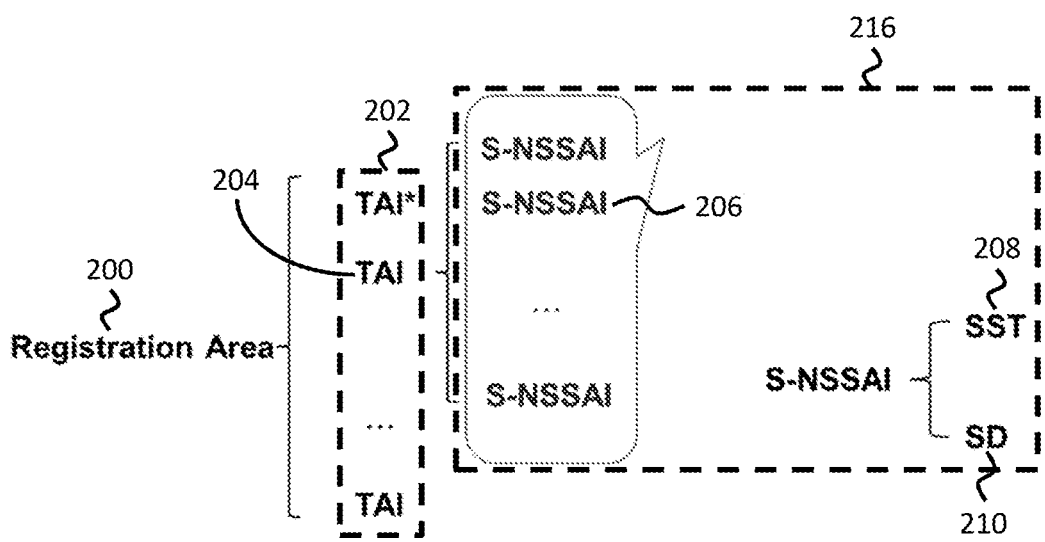
FIG. 2 shows slice support information according to an embodiment.

FIG. 2 shows slice support information 216 according to an embodiment.

In this embodiment, a network slice is identified by a Single Network Slice Selection Assistance information (S-NSSAI) 206. The slice support information 216 for a given slice support area comprises the S-NSSAI 206 of at least one network slice that is supported or that is not supported by the given slice support area. Particularly, it can comprise the S-NSSAI 206 of all network slices that are supported by the given slice support area or, alternatively, it can comprise the S-NSSAI 206 of all network slices that are not supported by the given slice support area.

According to the specification 3GPP TS 23.501 v1.2.0, an S-NSSAI 206 can comprise a Slice/Service type, SST, which refers to the expected network slice behaviour in terms of features and services. Optionally, the S-NSSAI 206 can also comprise a Slice Differentiator, SD, 210 which complements the Slice/Service type(s) to differentiate amongst multiple network slices of the same Slice/Service type.

The Network Slice Selection Assistance information, NSSAI, is a collection of S-NSSAIs. There can be for example at most 8 S-NSSAIs in the NSSAI sent in signalling messages between the user equipment 102 and the communication network 104. Each S-NSSAI assists the communication network in selecting a particular network slice instance.

In the embodiment of FIG. 2, a slice support area is preferably in the form of a tracking area, and the slice support area is identified by a Tracking Area identity (TAI) 204. The registration area 200 is defined by a TAI list 22. The TAI list 202 comprises the TAI 204 of all slice support areas comprised in the registration area 200.

In this embodiment, the slice support information can be transmitted by the network entity 114 for each slice support area of the registration area 200, each slice support area being identified by its TAI 204. Alternatively, the slice support information can be transmitted by the network entity 114 for only a part of the slice support areas of the registration area 200.

In the embodiment of a network entity 114 transmitting to the user equipment 102 slice support information 116 for at least one slice support area that is not comprised in the registration area 200, then the slice support area can be identified by a TAI. Furthermore, the slice support information 116 for a given slice support area identified by a TAI can comprise the S-NSSAI of at least one network slice that is supported or not supported by the given slice support area.

The embodiment of a network entity 114 transmitting to the user equipment 102 slice support information 116 for at least one slice support area that is neighbouring a slice support area of the registration area 200 is similar. The slice support area can be identified by a TAI. Furthermore, the slice support information 116 for a given slice support area identified by a TAI can comprise the S-NSSAI of at least one network slice that is supported or not supported by the given slice support area.

Figure 3:
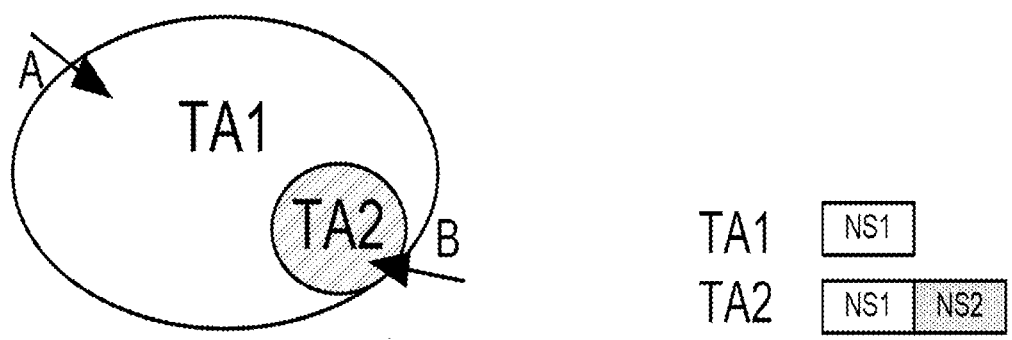
FIG. 3 shows a scenario with different slice supports according to an embodiment.

FIG. 3 shows a scenario with different slice supports according to an embodiment. Particularly, FIG. 3 shows a first and a second slice support area of the communication network. The two slice support areas can be in the form of tracking areas TA1, TA2.

The second slice support area TA2 is comprised within the first slice support area TA1. In other words, the radio coverage of the second slice support area TA2 is within the radio coverage of the first slice support area TA1. In such a scenario the second slice support area TA2 can for example provide more network slices than the first slice support area TA1. In the embodiment of FIG. 3, the second slice support area TA2 provides two network slices NS1, NS2, while the first slice support area TA1 provides only network slice NS1.

In case the user equipment profile allows for the connection to both network slices NS1, NS2, the transmission of the slice support information 116 for both slice support areas TA1, TA2 can be advantageous. For example, such a transmission can be advantageous particularly if the registration area 200 is defined as comprising the first and second slice support areas TA1, TA2.

On the one hand, in the scenario illustrated by arrow B in FIG. 3, the user equipment enters the registration area at a location where it can initiate network slices of the first or second slice support area TA1, TA2. In case the user equipment only needs the network slice NS1, it can advantageously initiate the network slice NS1 via the first slice support area TA1. Since the radio coverage of the first slice support area TA1 is larger than the radio coverage of the second slice support area TA2, the signalling overhead can be kept low. Indeed, if the user equipment would initiate the network slice NS1 via the second slice support area TA2, then additional signalling would be necessary when the user equipment leaves the second slice support area TA2 and enters the first slice support area TA1.

On the other hand, in the scenario illustrated by arrow A in FIG. 3, the user equipment enters the registration area at a location where it can initiate network slices of only the first slice support area TA1. The reception by the user equipment of slice support information regarding both slice support areas TA1, TA2 is advantageous in this scenario. Indeed, if the user equipment needs the network slice NS2, it can initiate the network slice NS2 via the second slice support area TA2 as soon as it enters the radio coverage of the second slice support area TA2.

Particularly, the network entity 114 can be adapted to transmit the slice support information 116 and registration area information in a message to the user equipment 102. The registration area information indicates the one or plurality of slice support areas comprised in the registration area.

Figure 4:
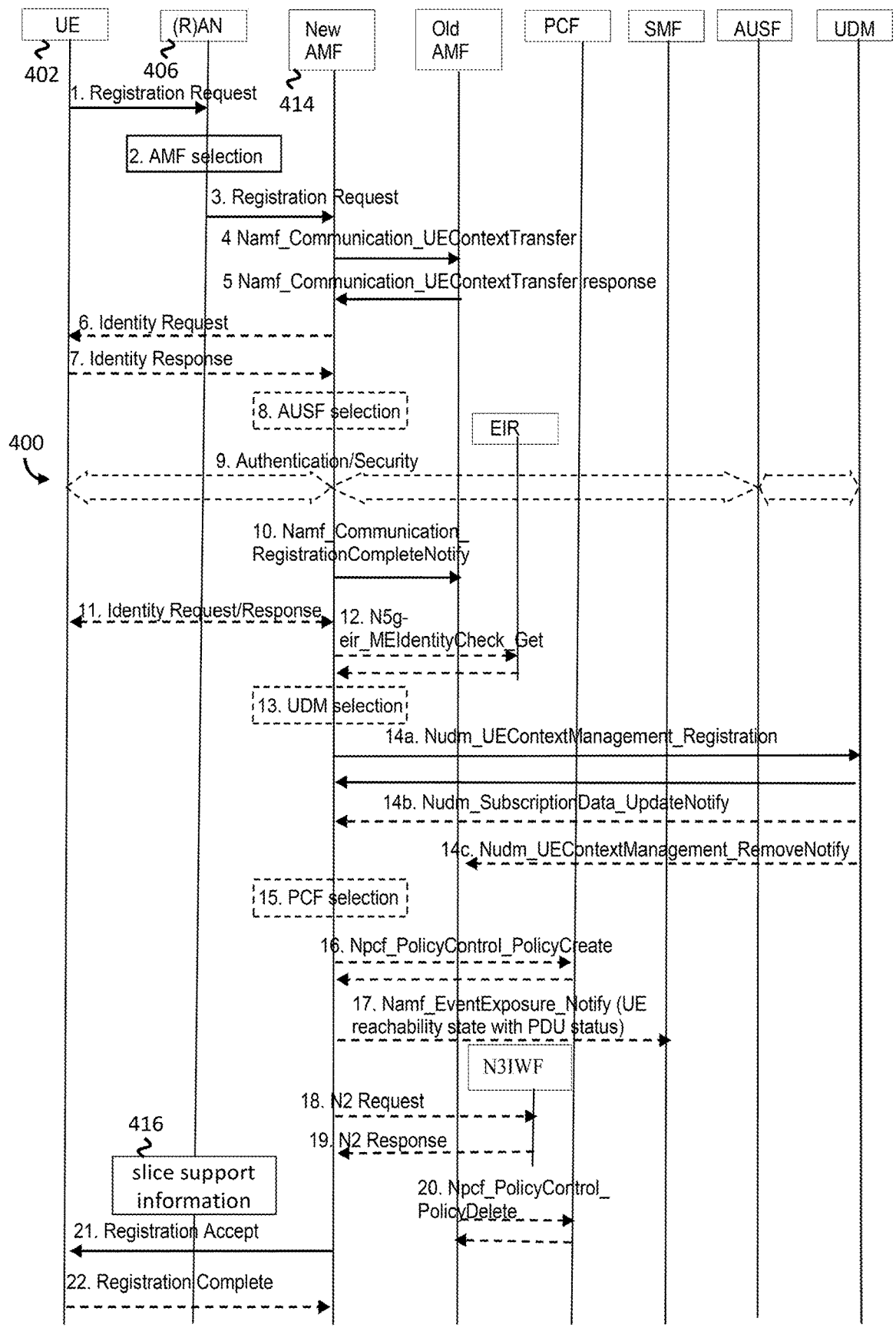
FIG. 4 shows a transmission of slice support information during a registration procedure according to an embodiment.

FIG. 4 shows a transmission of slice support information during a registration procedure 400 according to an embodiment. Particularly, FIG. 4 shows an embodiment for implementing the transmission of slice support information in the registration procedure. Such a registration procedure is in accordance with 5G systems, for example in accordance with the specification 3GPP TS 23.502 v0.6.0.

The user equipment needs to register with the communication network to get authorized to receive services so as to enable mobility tracking and reachability. The registration procedure can be used in different use cases:
  during the initial user equipment registration to the 5G system,
  as a mobility registration update when the user equipment moves to a new slice area support or tracking area that is located outside of the registration area 200 of the user equipment, the user equipment being for example in idle state,
  as a periodic registration update, and/or
  when the user equipment needs to update its capabilities or protocol parameters.

FIG. 4 comprises a user equipment 402, a RAN 406, a network entity 414 and slice support information 416, which respectively correspond to the user equipment 102, RAN 106, network entity 114 and slice support information 116 of FIG. 1.

In step 1, the user equipment 402 sends a Registration Request to the RAN 406. This request can comprise information about a network slice that the user equipment 402 wants to initiate and/or information about network slice(s) that the user equipment 402 can or is authorized to use.

After the RAN 406 has selected the network entity 414 in step 2, the RAN 406 forwards the Registration Request to the network entity 414 in step 3. The network entity 414 preferably corresponds to the AMF of 5G systems.

Further steps are then carried out in the communication network for performing the registration of the user equipment 402. These steps are referred to in FIG. 4 as steps 4 to 20 and involve preferably the PCF, SMF, AUSF, UDM as well as a previous network entity referred to as Old AMF in FIG. 4.

In step 21, the network entity 414 transmits to the user equipment 402 a Registration Accept message to indicate that the registration has been accepted by the communication network. The Registration Accept message comprises the slice support information 416. The slice support information 416 is preferably transmitted in the Registration Accept message as a separate or additional Information Element (IE).

Preferably this Registration Accept message also includes the registration area 200 for example in the form of the TAI list 204.

The Registration Accept message can indicate one or more established Protocol Data Unit (PDU) sessions to the user equipment in a PDU session status. The user equipment can remove locally any internal resources related to PDU sessions that are not marked as established in the received PDU session status.

The Registration Accept message can comprise an indication of allowed network slices, i.e. an indication of network slices that are allowed by the communication network. This indication of allowed network slices can be in the form of corresponding S-NSSAIs.

Optionally, the user equipment can transmit in step 22 a Registration Complete message to the network entity 414 to acknowledge the registration and/or to acknowledge the reception of the slice support information 416.

Figure 5:
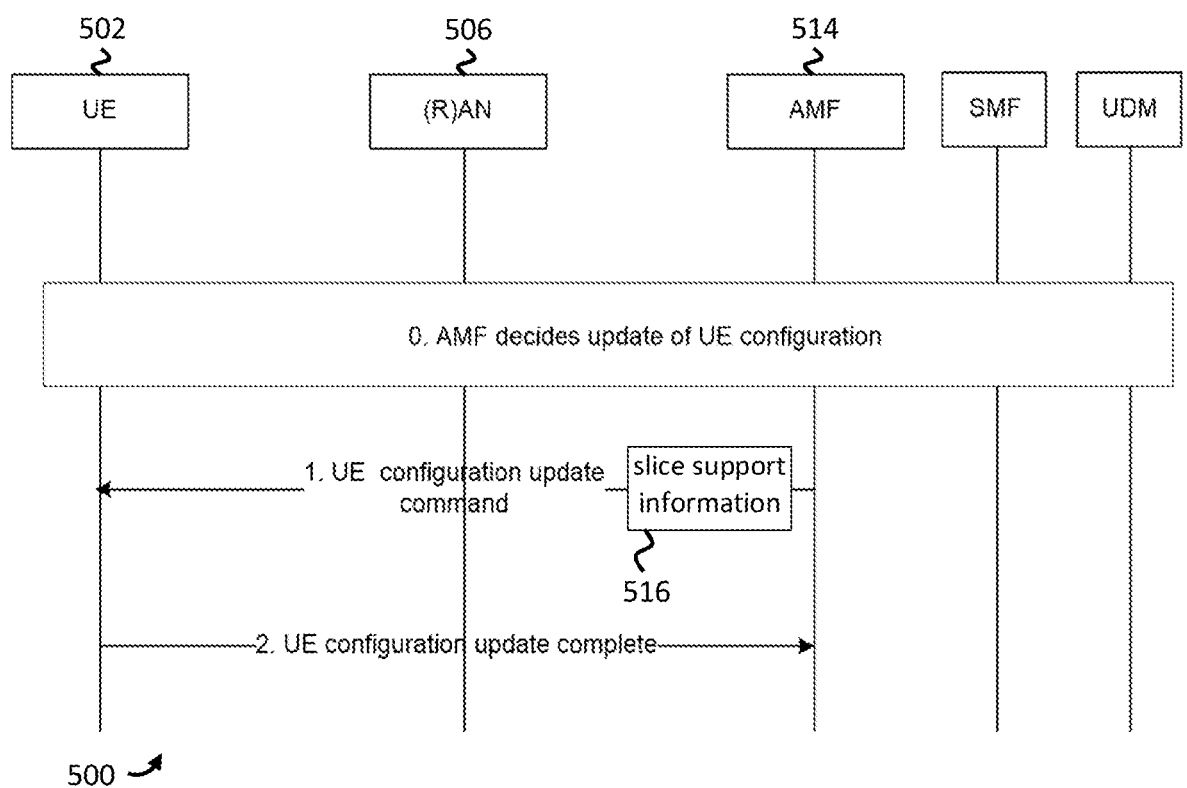
FIG. 5 shows a transmission of slice support information during a user equipment configuration update procedure according to an embodiment.

FIG. 5 shows a transmission of slice support information during a user equipment configuration update procedure according to an embodiment of the present invention. Particularly, FIG. 5 shows an embodiment for implementing the transmission of slice support information in the user equipment configuration update procedure. Such a user equipment configuration update procedure is in accordance with 5G systems, for example in accordance with the specification 3GPP TS 23.502 v0.6.0.

FIG. 5 comprises a user equipment 502, a RAN 506, a network entity 514 preferably in the form of an AMF and slice support information 516, which respectively correspond to the user equipment 102, RAN 106, slice support area 114 and slice support information 116 of FIG. 1.

The user equipment configuration update procedure 500, UE Configuration Update procedure, is used when the network entity 514 wants to change the user equipment configuration or wants to trigger a user equipment registration update procedure.

In a step 1, the network entity 514 sends a user equipment configuration update command, UE Configuration Update command, to the user equipment. The UE Configuration Update command comprises the slice support information 516. Preferably, the UE Configuration Update command can carry the new or updated registration area 200 for the user equipment 502, and the related slice support information 516. The slice support information 516 is preferably transmitted in the UE Configuration Update command as a separate or additional Information Element, IE.

FIG. 5 shows the example of UE configuration Update procedure with acknowledgement. The acknowledgement is sent by the user equipment in step 2 to acknowledge the completion of the procedure and/or to acknowledge the reception of the slice support information 516. The acknowledgment step 2 is optional.

The Registration Accept message of FIG. 4 and the UE Configuration Update command of FIG. 5 are examples of NAS signalling comprising the slice support information 416, 516. Alternatively, the slice support information 116 can be transmitted by means of other messages or NAS signalling over the connection N1 between network entity and user equipment. Particularly, other NAS procedures can also be used to piggy back the slice support information 116 to the user equipment.

Preferably, the communication network 104 can allocate a registration area 200 to the user equipment according to two types of allocation or assignment. The first allocation type consists in allocating a registration area with different slice support within the registration area. In other words, it is possible that the slice support areas of the registration area have different supported network slices. The second allocation type consists in allocating a registration area with the constraints that the network slice support should be the same in all slice support areas of the registration area.

Depending on the user equipment capability, the first allocation type or the second allocation type can be used. If the user equipment is capable of recognizing the slice support of the network at the current location (e.g. by some network assistance), the first allocation can be used. Otherwise, the second allocation can be used.

Preferably, the transmission of slice support information 116 is performed by means of an extended NAS signalling over the N1 interface, e.g. by means of a message exchanged during the registration procedure or the user equipment configuration update procedure. The related message can comprise an extended registration area IE, which can include the supported network slices S-NSSAI(s) for each slice support area in the registration area.

The user equipment is able to derive the slice availability in given slice support area(s) by reading the slice support information that is transmitted for the given slice support area(s). This can be done for example by receiving the enhanced NAS signalling and reading the TAI list 202 of the registration area 200 as well as the slice support information 216 for each element of the TAI list 202.

Particularly, when transmitting the slice support information 116, it is possible to improve the slice support awareness of the user equipment within the registration area. The user equipment can receive a list of network slices that are supported (e.g. list of S-NSSAI 206). The network can send the registration area information (e.g. the TAI list 202) to the user equipment together with the supported S-NSSAI(s) 206 of each slice support area in the TAI list (e.g. during the registration procedure). The user equipment can store locally the TAI list 202 and the supported S-NSSAI(s) 206 of each slice support area in the TAI list 202.

When crossing the boundary of slice support areas in the registration area, the user equipment intercepts the TAI 204 of the current slice support area from the RAN (e.g. by intercepting system information from a radio broadcast channel). The user equipment checks the stored TAI list 202, and knows the supported slices in the current slice support area. Such slice support information can be used by the user equipment to decide which network slice shall be used to initiate a service request. For example, it is possible to map the service request to a supported network slice that is not the default/optimal one for that service. For example, it is also possible for the user equipment to understand that it can request a network slice that was not supported by the previous slice support area.

Particularly, it is possible to optimize the registration area allocation or assignment strategy. For example, it is possible to assign a registration area to the user equipment in idle mode/state by taking into account the unified slice support for the slice(s) most probably to be used. For example, it is possible to assign a registration area to the user equipment in active mode/state by taking into account the unified support for the slice(s) of active PDU session(s) and potentially also the other slice(s) most probably to be used. Preferably, only the availability of the slice(s) described above (in idle/active state) should be considered when the network decides on the registration area of a user equipment.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A network entity for controlling the use, by a user equipment (UE), of network slices of a communication network, the communication network including a plurality of slice support areas, the network entity comprising:
    processing circuitry configured to:
        ascertain a registration area allocated to the UE,
        determine a plurality of slice support areas included in the registration area allocated to the UE, and
        transmit, to the UE, respective slice support information for at least one given slice support area of the plurality of determined slice support areas, the respective slice support information for the at least one given slice support area indicating at least one network slice supported by the at least one given slice support area and/or at least one network slice not supported by the at least one given slice support area,
    wherein each respective slice support area of the plurality of determined slice support areas comprises at least one cell, and
    wherein each cell of each respective slice support area of the plurality of determined slice support areas supports the same network slices.

2. The network entity according to claim 1, wherein the processing circuitry is further configured to:
    allocate the registration area to the UE, and
    transmit, to the UE, additional slice support information for multiple additional slice support areas of the registration area.

3. The network entity according to claim 2, wherein the processing circuitry is configured to:
    allocate the registration area to the UE in response to receiving a registration request sent by the UE, and
    transmit, in a registration accept message to the UE, the respective slice support information for the at least one given slice support area, the additional slice support information, and registration area information,
    wherein the registration accept message indicates that the registration request has been accepted by the communication network, and
    wherein the registration area information identifies the plurality of determined slice support areas.

4. The network entity according to claim 1, wherein the processing circuitry is configured to:
    transmit the respective slice support information for the at least one given slice support area in a Non-Access Stratum (NAS) message over a signalling interface (N1) defined between the network entity and the UE.

5. The network entity according to claim 1, wherein the processing circuitry is configured to:
    transmit the respective slice support information for the at least one given slice support area to the UE during a procedure of registration of the UE with the communication network.

6. The network entity according to claim 1, wherein the processing circuitry is configured to:
    transmit the respective slice support information for the at least one given slice support area to the UE during a UE configuration update procedure, the UE configuration update procedure being used by the network entity to change the UE configuration or to trigger a UE registration update procedure.

7. The network entity according to claim 1, wherein each respective network slice supported by each respective slice support area of the plurality of determined slice support areas is identified by a respective Single Network Slice Selection Assistance information (S-NSSAI), and
    wherein the respective slice support information for the at least one given slice support area comprises the S-NSSAI of the at least one network slice supported by the at least one given slice support area and/or the S-NSSAI of the at least one network slice not supported by the at least one given slice support area.

8. The entity according to claim 7, wherein each respective slice support area of the plurality of slice support areas included in the registration area is a respective Tracking Area (TA) and is identified by a respective Tracking Area identity (TAI),
    wherein a TAI list comprises the respective TAI of each respective TA comprised in the registration area, and
    wherein the processing circuitry is further configured to:
    associate, with each respective TAI in the TAI list, a respective S-NSSAI list comprising the S-NSSAI of at least one network slice supported or not supported by the TA identified by the respective TAI,
    transmit, to the UE, the TAI list and the respective S-NSSAI list associated with each TAI of the TAI list.

9. The entity according to claim 1, wherein the processing circuitry is further configured to:
    allocate the registration area to the UE for the registration of the UE with the communication network, and
    transmit, to the UE, slice support information for at least one slice support area that is not comprised in the registration area and/or slice support information for at least one slice support area that is neighbouring a slice support area of the registration area.

10. The network entity according to claim 1, wherein the processing circuitry is further configured to:
    select, for the registration of the user equipment with the communication network, the at least one given slice support area, wherein the at least one given slice support area is selected based on a state and/or a profile and/or a capability of the UE.

11. The network entity according to claim 10, wherein the processing circuitry is further configured to:
   select the at least one network slice supported by the at least one given slice support area based on a state and/or a profile and/or a capability of the UE and/or slice use information,
   wherein the slice use information indicates at least one network slice that can be used by the UE or at least one network slice that the UE is allowed to use.

12. The network entity according to claim 1, wherein the network entity implements an Access and Mobility Management function (AMF).

13. A user equipment (UE) for using network slices of a communication network comprising a plurality of slice support areas, the UE comprising:
   processing circuitry configured to receive, from the communication network:
      slice support information for at least one given slice support area included in a registration area allocated by the communication network to the UE, the slice support information for the given slice support area indicating at least one network slice supported by the at least one given slice support area and/or at least one network slice not supported by the at least one given slice support area,
      additional slice support information for multiple additional slice support areas included in the registration area, and
      registration area information that identifies the at least one given slice support area and the multiple additional slice support areas included in the registration area,
   wherein each slice support area included in the registration area comprises at least one cell, and
   wherein each cell of each respective slice support area included in the registration area supports the same network slices.

14. The use equipment according to claim 13, wherein the UE is configured to:
   transmit a service request to the communication network for a service corresponding to a network slice indicated by the slice support information for the at least one given slice support area.

15. A method for using, by a user equipment, network slices of a communication network, the communication network including a plurality of slice support areas, the method comprising:
   receiving, from the communication network:
      slice support information for at least one given slice support area included in a registration area allocated by the communication network to the UE, the slice support information for the at least one given slice support area indicating at least one network slice supported by the at least one given slice support area and/or at least one network slice not supported by the at least one given slice support area,
      additional slice support information for multiple additional slice support areas included in the registration area, and
      registration area information that identifies the at least one given slice support area and the multiple additional slice support areas included in the registration area,
   wherein each slice support area included in the registration area comprises at least one cell, and
   wherein each cell of each respective slice support area included in the registration area supports the same network slices.

* * * * *

UNITED STATES PATENT AND TRADEMARK OFFICE
CERTIFICATE OF CORRECTION

PATENT NO. : 11,172,435 B2
APPLICATION NO. : 16/810583
DATED : November 9, 2021
INVENTOR(S) : Wei et al.

It is certified that error appears in the above-identified patent and that said Letters Patent is hereby corrected as shown below:

In the Claims

Claim 8: Column 18, Line 44: "identity (TAD," should read -- identity (TAI), --.

Signed and Sealed this
Twenty-first Day of June, 2022

Katherine Kelly Vidal
*Director of the United States Patent and Trademark Office*